United States Patent [19]

Shibazaki et al.

[11] Patent Number: 5,700,534
[45] Date of Patent: Dec. 23, 1997

[54] COLORING FLUID-CONTAINING MARKING DEVICE MADE OF BIODEGRADABLE PLASTIC RESIN

[75] Inventors: Masaki Shibazaki; Mikiya Ido, both of Aichi; Tohru Watanabe, Tokyo, all of Japan

[73] Assignee: The Pilot Ink Co., Ltd., Nagoya, Japan

[21] Appl. No.: 511,150

[22] Filed: Aug. 4, 1995

[30] Foreign Application Priority Data

Aug. 11, 1994 [JP] Japan .................. 6-212171

[51] Int. Cl.$^6$ .................................. B43K 5/02
[52] U.S. Cl. .............. 428/36.92; 428/35.7; 428/36.9; 401/21; 401/23; 401/25; 401/26; 401/27; 401/55; 401/61; 401/126; 401/137; 401/138; 401/139; 401/143; 401/144; 401/192; 401/196; 401/197; 401/198; 401/199; 401/208; 401/220
[58] Field of Search .................. 428/35.7, 36.9, 428/36.91, 36.92; 401/21, 23, 25, 26, 27, 55, 61, 126, 137, 138, 139, 143, 144, 192, 196, 197, 198, 199, 208, 220

[56] References Cited

U.S. PATENT DOCUMENTS

| | | | |
|---|---|---|---|
| 3,427,967 | 2/1969 | Thielen | 101/211 |
| 4,923,317 | 5/1990 | Bishop et al. | 401/205 |
| 5,288,160 | 2/1994 | Li et al. | 401/198 |
| 5,310,782 | 5/1994 | Takiyama et al. | 524/706 |
| 5,383,737 | 1/1995 | Unon | 401/48 |
| 5,391,644 | 2/1995 | Yasuda et al. | 525/440 |

FOREIGN PATENT DOCUMENTS

| | | |
|---|---|---|
| 0565235 | 10/1993 | European Pat. Off. . |
| 61-243873 | 10/1986 | Japan . |
| 06009010 | 1/1994 | Japan . |

*Primary Examiner*—James J. Seidleck
*Assistant Examiner*—Michael A. Williamson
*Attorney, Agent, or Firm*—Sughrue, Mion, Zinn, Macpeak & Seas, PLLC

[57] ABSTRACT

A coloring fluid-containing marking device which sufficiently withstand practical use and, after use, its molded members can be biologically degraded in soil. The marking device comprises a coloring fluid container molded from an aliphatic polyester resin, and a coloring fluid containing a solvent mainly comprising an aliphatic hydrocarbon and/or an alicyclic hydrocarbon.

7 Claims, No Drawings

COLORING FLUID-CONTAINING MARKING DEVICE MADE OF BIODEGRADABLE PLASTIC RESIN

FIELD OF THE INVENTION

The present invention relates to a marking device made of a biodegradable plastic resin which can contributes to reduction of accumulation of waste.

BACKGROUND OF THE INVENTION

Several kinds of naturally degradable plastic resins have recently been proposed, and it has been attempted to apply them in various fields. For example, application to molded parts of marking devices, such as a barrel or a cap, has been attempted. However, biodegradable starch-based polymers are instable against humidity or water, starch-polyethylene-based polymers leave polyethylene undegraded, and photolyzable plastic resins have difficulty in storing before use and in selecting a photosensitizer and also entail a high cost. Aliphatic polyesters which are most expected to be practically useful encounter difficulties when applied as a molding material for a barrel, a cap, etc. of marking devices containing a coloring fluid because these polymers have very high permeability to vapor of the solvent in the coloring fluid. For the time being, application of biodegradable plastic resins to marking devices is limited to barrels of pencils containing no liquid.

An object of the present invention is to provide coloring fluid-containing marking devices which use a molded article of a biodegradable plastic resin as a molded part, such as an coloring fluid container, a barrel, or a cap, and still withstand practical use.

SUMMARY OF THE INVENTION

Of currently available naturally degradable plastic resins, aliphatic polyesters synthesized mainly from a glycol and an aliphatic dicarboxylic acid possess both biodegradability and moldability, so that the present inventors studied them as a candidate applicable to parts of marking devices.

However, aliphatic polyesters exhibit no barrier properties against vapor of solvents commonly employed in coloring fluids of marking devices, such as water, alcohols and xylene. Therefore, where a coloring fluid containing a conventional solvent is used in a marking device made of aliphatic polyester molded articles, the solvent would permeate through the molded articles and evaporate, shortly making the device practically useless for writing or painting.

Taking the above problem into consideration, the inventors have investigated combinations of coloring fluids containing various solvents and aliphatic polyester molded articles, and completed the present invention.

Thus, the marking devices according to the present invention comprise a molded article obtained from an aliphatic polyester, which is a biodegradable plastic resin, and a coloring fluid comprising a solvent selected from an aliphatic hydrocarbon, an alicyclic hydrocarbon and a mixture thereof, and a resin soluble in that solvent.

That is, the present invention provides a marking device comprising a container containing a coloring fluid therein, said container being a molded article of an aliphatic polyester, and said coloring fluid comprising a colorant, a solvent mainly comprising a member selected from the group consisting of an aliphatic hydrocarbon, an alicyclic hydrocarbon and a mixture thereof, and a resin soluble in said solvent.

DETAILED DESCRIPTION OF THE INVENTION

Illustrative examples of the marking device of the present invention include writing devices, painting devices, etc. such as ball-point pens, marking pens, drawing pens, and the like.

Illustrative examples of the molded article constituting the marking device of the present invention include ink containers, barrels, caps, pen-tip holding parts, tail plugs, ink containers provided as a separate part, and the like.

Aliphatic polyesters are polymers obtained by polycondensation using as main components a glycol and an aliphatic dicarboxylic acid and they are commercially available. For the use intended in the present invention, aliphatic polyesters having the structure represented by formula (I) or (II) shown below are preferable (cf. unexamined published Japanese patent application 6-41288 corresponding to EP-A2-572256 and U.S. Pat. No. 5,310,782, incorporated herein by reference).

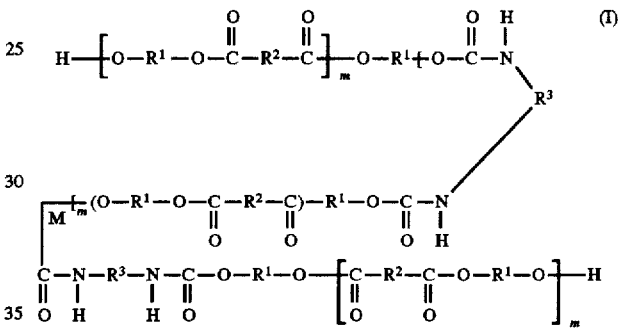

wherein m represents a degree of polymerization making the number average molecular weight 10,000 to 100,000; M represents an integer of 0 or more; $R^1$ and $R^2$, which may be the same or different, each represent an alkylene group, a cycloalkylene group, or a cycloalkylene-containing alkylene group, the alkylene group or alkylene moiety of which may be straight or branched; and $R^3$ represents a di- or polyisocyanate residue.

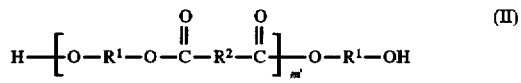

wherein m' represents a degree of polymerization making the number average molecular weight 25,000 to 70,000; and $R^1$ and $R^2$, which may be the same or different, each represent an alkylene group, a cycloalkylene group, or a cycloalkylene-containing alkylene group, the alkylene group or alkylene moiety of which may be straight or branched.

The alkylene group, cycloalkylene group and cycloalkylne-containing alkylene group represented by $R^1$ or $R^2$ may preferably have 2 to 10 carbon atoms, 3 to 10 carbon atoms, and 4 to 10 carbon atoms, respectively. The alkylene group and the alkylene moiety of the cycloalkylene-containing alkylene group may be straight or branched. The cycloalkylene-containing alkylene group means an alkylene group having a cycloalkylene group and illustrative examples thereof include a group represented by the formula:

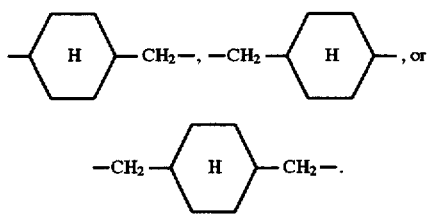

The term "coloring fluid" as used herein is a general term denoting inks, marking liquids, painting liquids, and the like.

Colorants which can be used in the coloring fluid include solvent dyes, such as Nigrosine Base EX, Oil Black HBB, Vali Fast Red 1308 or 1355, Oil Pink 312, Oil Yellow 101, 105 or 107, Oil Orange 201 or 203, and Oil Blue 613 (all produced by Orient Kagaku Kogyo K.K.), Spilon Yellow C-GNH, Spilon Red CGH, and Spilon Violet CRH (all produced by Hodogaya Chemical Co., Ltd.), Oleosol Black AR and Rhodamine B Base (both produced by Taoka Chemical Co., Ltd.), Neopene Blue 808 and Neptune Red Base 486 (both produced by BASF AG), and Savinyl Blue GLS (produced by Sandoz Ltd.); metallic luster pigments, such as aluminum pigment and gold pigment; inorganic pigments, such as titanium oxide and carbon black; insoluble azo pigments, such as β-naphthol type, naphthol AS type, benzimidazolone type, acetoacetanilide type, and pyrazolone type; phthalocyanine pigments, such as Phthalocyanine Blue; condensed polycyclic pigments, such as threne pigments, indigoid pigments, perinone pigments, and quinacridone pigments; and fluorescent pigments.

Solvents which can be used in the coloring fluid include aliphatic hydrocarbons, such as n-pentane, n-hexane, 2-methylpentane, 2,2-dimethylbutane, 2,3-dimethylbutane, n-heptane, heptane isomers, n-octane, octane isomers, n-nonane, 2,2,5-trimethylhexane, n-decane, n-dodecane, and mineral spirit; and alicyclic hydrocarbons, such as cyclopentane, methylcyclopentane, cyclohexane, methylcyclohexane, ethylcyclohexane, isopropylcyclohexane, butylcyclohexane, and decalin; and hexane, heptane, methylcyclohexane, and ethylcyclohexane are particularly preferred above all. These solvents occupy at least 90% by weight of the total solvent. These solvents may be used alone or as a mixture of two or more.

If desired, glycol solvents compatible with the above-mentioned main solvents, such as hexylene glycol or octylene glycol, may be used as auxiliary solvents in an amount of less than 10% by weight based on the total solvents.

Resins soluble in the above-mentioned solvents include alkyl phenol resins, terpene phenol resins, phenol-modified xylene resins, xylene resins, terpene resins, acrylic resins, methacrylic resins, aliphatic hydrocarbon resins, alicyclic hydrocarbon resins, alkyd resins, vinyl resins, polyester resins, vinyl alkyl ether resins, and styrene-butadiene elastomers, and the like.

If desired, additives, such as higher fatty acids (e.g., stearic acid and oleic acid), solid higher alcohols (e.g., myristyl alcohol and cetyl alcohol), animal or vegetable oils (e.g., castor oil and terpene oils), and acidic phosphoric esters, may be added as a solubilizer for the oil-soluble dyes.

The above-described colorants, solvents, resins, and additives may be used in an amount of 3 to 30% by weight, 40 to 90% by weight, 3 to 30% by weight, and 0 to 5% by weight, respectively, based on the coloring fluid.

The solvent mainly comprising an aliphatic hydrocarbon, an alicyclic hydrocarbon, or a mixture thereof does not swell aliphatic polyesters, and the vapor of the solvent is hardly permeable into an aliphatic polyester layer. Accordingly, the marking devices of the present invention comprising a combination of aliphatic polyester molded articles and the above-described coloring fluid are practically useful equally to conventional marking devices and yet the molded articles can be biologically degraded in soil after use.

EXAMPLE 1

A marking pen having the following structure was manufactured as a typical example of marking devices and subjected to the tests described below.

An aliphatic polyester resin ("BIONOLLE #1000", produced by Showa Highpolymer Co., Ltd.) was molded to prepare three parts: a cylindrical barrel with its one end open and with the other end shaped into a small diameter pen-tip holding part, a cap which is designed to fit on the pen-tip holding part hermetically, and a tail plug which is to be fitted into the open end of the barrel. A pen-tip of a fiber bundle-resin was inserted into the pen-tip holding part, and an ink absorber made of a fiber bundle having been impregnated with a sample ink was put into the barrel. The tail plug was fitted into the open end of the barrel, and the cap was fitted on the pen-tip holding part to complete a sample marking pen.

The main body of the barrel and the main body of the cap had a wall thickness of from 1.0 to 1.1 mm. The main body of the barrel had an outer diameter of 20 mm at the tail end and 18 mm at the front. The pen-tip holding part had an outer diameter of 8 mm. The total length of the marking pen was 155 mm.

The compositions of sample inks A to D and P to S used in the sample marking pens are shown in Table 1. Sample inks A to D are the ones using a solvent mainly comprising an aliphatic hydrocarbon and/or an alicyclic hydrocarbon in a proportion of 90% by weight or more based on the total solvents, while sample inks P to S are those using other solvents.

TABLE 1

| Composition of Sample Inks (part by weight) | | | | | | | | |
|---|---|---|---|---|---|---|---|---|
| | Sample Inks | | | | | | | |
| | A | B | C | D | P | Q | R | S |
| Colorant: | | | | | | | | |
| Oleosol Black AR[1] | 8 | | | | 8 | | | |
| Oil Pink 312[2] | | 4 | | | | 4 | | |
| Spilon Yellow C-GNH[3] | | | 1 | | | | 1 | |
| Oil Blue 613[4] | | | | 5 | | | 5 | |
| White pigment paste[5] | | | | 40 | | | | 40 |
| Resin and Additive: | | | | | | | | |
| Alkyl phenol resin[6] | 10 | 15 | 10 | 10 | 10 | 15 | 10 | 10 |
| Terpene phenol resin[7] | 2 | 5 | | | 2 | 5 | | |
| Terpene resin[8] | | | 15 | | | | 15 | |
| Acidic phosphate[9] | 3 | | 3 | | 3 | | 3 | |
| Solvent: | | | | | | | | |
| Ethylcyclohexane | 72 | 27 | | | | | | |
| Methylcyclohexane | | | 50 | 35 | | | | |
| n-Heptane | | 80 | | | | | | |
| Hexylene glycol | 5 | | | | | | | |
| Ethyl alcohol | | | | | 57 | 80 | | |
| n-Butyl alcohol | | | | | 20 | | 20 | |
| Xylene | | | | | | | 57 | |
| Butyl acetate | | | | | | | | 35 |

The materials shown in the Table will be explained below with the note numbers.

1): Oil-soluble black dye (C.I. Solvent Black 50)
2): Oil-soluble pink dye (C.I. Solvent Red 49)
3): Oil-soluble yellow dye (CAS. No. 103349-70-8)
4): Oil-soluble blue dye (C.I. Solvent Blue 5)
5): White pigment paste consisting of 65 wt % of rutile type titanium oxide, 16.5 wt % of a terpene resin ("Piccolite S1500", produced by Rika Hercules), 2.5 wt % of a dispersant, and 16 wt % of ethylcyclohexane.
6): Octyl phenol resin ("Hitanol 1501", produced by Hitachi Chemical Co., Ltd.; softening point: 80° to 100° C.; acid value: 85 to 100)
7): "YS Polystar T115", produced by Yasuhara Chemical K.K.; softening point: 115° C.; acid value: 1 or less
8): "YS Resin PX-1150", produced by Yasuhara Chemical K.K.; softening point 115° C.; acid value: 1 or less
9): Polyoxyethylene alkyl ether phosphate ("Phosphanol RD-510Y", produced by Toho Chemical Industry Co., Ltd.; pH: 2.5 or lower; HLB: 9.9)

Sample inks A to D were used in Examples 1 to 4, and sample inks P to S Comparative Examples 1 to 4. Fifteen marking pens were prepared per sample ink; 5 for an aging test at room temperature and 10 for an aging test in a thermostat at 40° C.

The 5 marking pens (per ink) for a room temperature aging test and 5 marking pens (per ink) for a 40° C. aging test were weighed immediately after the preparation and 1, 3, 5, 7 and 9 weeks thereafter an average solvent retention rate of each test group was calculated. The results obtained are shown in Table 2.

TABLE 2

| Temperature | Time | Solvent Retention Rate (%) | | | | | | | |
|---|---|---|---|---|---|---|---|---|---|
| | | Example 1 | Example 2 | Example 3 | Example 4 | Compara. Example 1 | Compara. Example 2 | Compara. Example 3 | Compara. Example 4 |
| room temp. | 1 wk. | 100 | 100 | 100 | 100 | 92 | 90 | 90 | 83 |
| room temp. | 3 wks. | 100 | 100 | 100 | 100 | 60 | 55 | 58 | 45 |
| room temp. | 5 wks. | 99 | 99 | 99 | 98 | 36 | 27 | 29 | 16 |
| room temp. | 7 wks. | 97 | 98 | 98 | 98 | 12 | 9 | 10 | 7 |
| room temp. | 9 wks. | 97 | 98 | 98 | 97 | 10 | 8 | 5 | 3 |
| 40° C. | 1 wk. | 100 | 101 | 101 | 100 | 52 | 48 | 63 | 55 |
| 40° C. | 3 wks. | 99 | 98 | 99 | 99 | 14 | 10 | 9 | 4 |
| 40° C. | 5 wks. | 97 | 96 | 97 | 98 | 3 | 3 | 2 | 1 |
| 40° C. | 7 wks. | 96 | 94 | 96 | 97 | 3 | 3 | 1 | 0 |
| 40° C. | 9 wks. | 94 | 90 | 94 | 95 | 3 | 3 | 0 | 0 |

The remaining 5 samples were preserved at 40° C. and examined after 30 days and 60 days whether they were still useful for writing. The results obtained are shown in Table 3.

TABLE 3

| | Examples 1 to 4 | Comparative Examples 1 to 4 |
|---|---|---|
| 40° C. × 30 dys. | usable for writing in each case | unusable for writing in each case |
| 40° C. × 60 dys. | usable for writing in each case | — |

As can be seen from the test results, the sample marking pens using a conventional solvent other than the solvents specified in the present invention suffer serious loss of the solvent due to vapor permeation through the container and therefore withstand no practical use. To the contrary, the sample marking pens according to the present invention withstand preservation even at a high temperature and are sufficiently applicable to practical use.

In addition, the aliphatic polyester used as a container material is biodegradable, i.e., undergoes biodegradation in soil after use, thereby making a contribution to reduction of accumulation of waste.

While the invention has been described in detail and with reference to specific examples thereof, it will be apparent to one skilled in the art that various changes and modifications can be made therein without departing from the spirit and scope thereof.

What is claimed is:

1. A marking device comprising a container containing a coloring fluid therein, said container being a molded article of a biodegradable aliphatic polyester, and said coloring fluid comprising a colorant, a liquid solvent mainly comprising a member selected from the group consisting of an aliphatic hydrocarbon having the formula $C_nH_{2n+2}$, wherein n is a positive integer, an alicyclic hydrocarbon and a mixture thereof, and a resin soluble in said solvent.

2. The marking device according to claim 1, wherein said container is a barrel of said marking device.

3. The marking device according to claim 1, wherein said marking device further comprises an molded article comprising an aliphatic polyester.

4. The marking device according to claim 1, 2, or 3, wherein said aliphatic polyester is represented by formula (I) or (II):

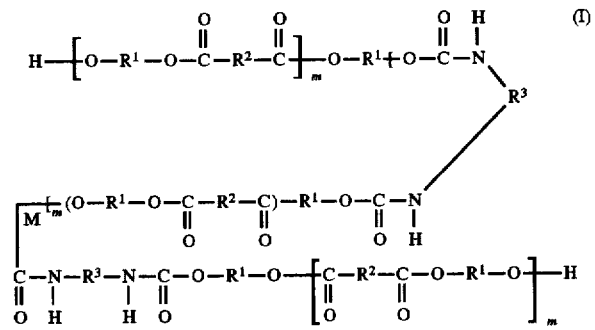

wherein m represents a degree of polymerization making the number average molecular weight 10,000 to 100,000; M represents an integer of 0 or more; $R^1$ and $R^2$, which may be the same or different, each represent an alkylene group, a cycloalkylene group, or a cycloalkylene-containing alkylene group, in which the alkylene group or alkylene moiety may be straight or branched; and $R^3$ represents a di- or polyisocyanate residue,

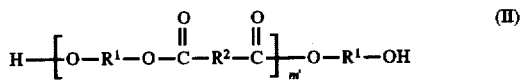

wherein m' represents a degree of polymerization making the number average molecular weight 25,000 to 70,000; and $R^1$ and $R^2$, which may be the same or different, each represent an alkylene group, a cycloalkylene group, or a cycloalkylene-containing alkylene group, in which the alkylene group or alkylene moiety may be straight or branched.

5. The marking device according to claim 4, wherein $R^1$ and $R^2$, which may be the same or different, each represent an alkylene group having 2 to 10 carbon atoms, a cycloalkylene group having 3 to 10 carbon atoms, or a cycloalkylene-containing alkylene group having 4 to 10 carbon atoms, in which the alkylene group or alkylene moiety may be straight or branched.

6. The marking device according to claim 1, wherein 90% by weight or more of the solvent of the coloring fluid is a member selected from the group consisting of an aliphatic hydrocarbon, an alicyclic hydrocarbon and a mixture thereof.

7. The marking device according to claim 6, wherein said solvent comprises a member selected from the group consisting of methylcyclohexane, ethylcyclohexane, hexane, heptane, and a mixture of two or more thereof.

* * * * *